United States Patent [19]

Patton

[11] Patent Number: 4,669,907
[45] Date of Patent: Jun. 2, 1987

[54] INDUSTRIAL SWIVEL

[75] Inventor: Jerry C. Patton, Broken Arrow, Okla.

[73] Assignee: The Crosby Group, Inc., Tulsa, Okla.

[21] Appl. No.: 848,327

[22] Filed: Apr. 3, 1986

Related U.S. Application Data

[63] Continuation of Ser. No. 602,961, Apr. 23, 1984, abandoned.

[51] Int. Cl.[4] .............................................. F16G 15/08
[52] U.S. Cl. ...................................... 403/78; 403/165; 403/344; 403/349; 403/348; 59/95
[58] Field of Search ................ 403/78, 164, 165, 261, 403/344, 349, 348; 59/95, 9

[56] References Cited

U.S. PATENT DOCUMENTS

| 2,246,588 | 6/1941 | Harrall | 403/165 X |
| 2,610,828 | 9/1952 | Crain | 403/78 X |
| 2,625,005 | 1/1953 | Myers | 403/78 X |
| 2,700,560 | 1/1955 | Hansen | 403/348 X |
| 2,811,378 | 10/1957 | Kalista | 403/78 X |
| 3,305,281 | 2/1967 | Dumpis | 403/164 X |
| 3,858,910 | 1/1975 | Oetiker | 403/78 X |
| 4,308,419 | 12/1981 | Fredriksson | 403/78 X |

FOREIGN PATENT DOCUMENTS 357836  10/1931  United Kingdom .................. 59/95

Primary Examiner—Cornelius J. Husar
Assistant Examiner—Todd G. Williams
Attorney, Agent, or Firm—Head, Johnson & Stevenson

[57] ABSTRACT

An industrial or heavy duty type swivel used to make connection between load receiving and hoisting devices with relative rotation therebetween, is assembled with minimal machined parts and includes an upper connector having a receiving cavity for a lower connector which has pre-assembled thereon, prior to interconnection within the cavity, a thrust washer or thrust bearing assembly which interconnects by a splined or bayonet type connection.

5 Claims, 8 Drawing Figures

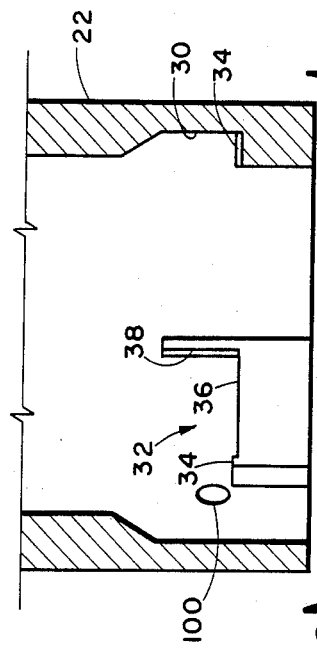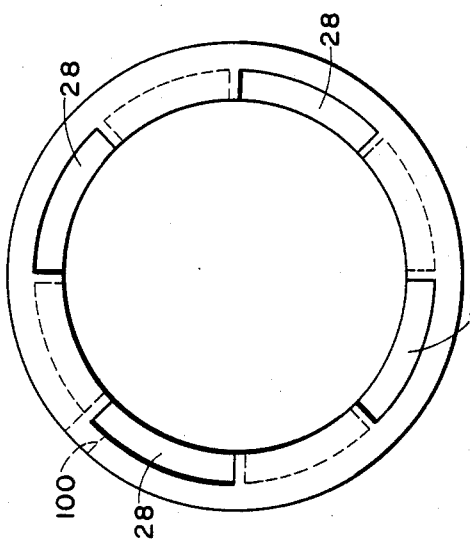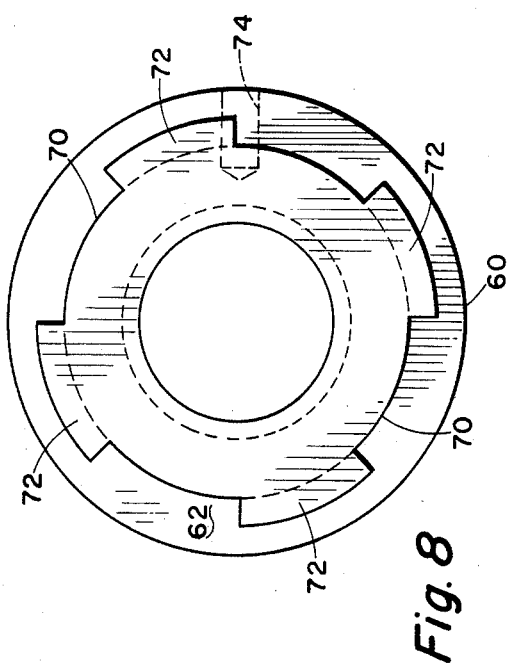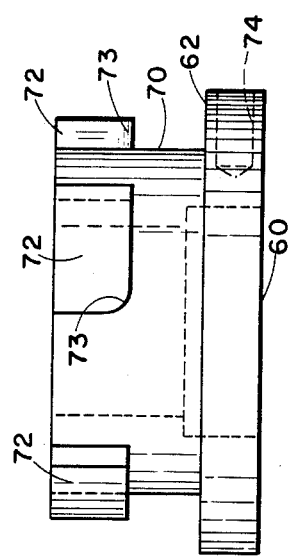

INDUSTRIAL SWIVEL

This is a continuation of co-pending application Ser. No. 602,961 filed on 4/23/84 now abandoned.

BACKGROUND OF THE INVENTION

The field of this invention is directed to industrial heavy duty type swivels which are used in making connection between a load receiving and a hoisting device which will have the freedom to rotate under design tension load conditions. Most swivels heretofore known have involved parts having intricate and extensive machining operations welded or precise press fit connections of the adjoining parts, and which were not necessarily easy to repair or maintain under field conditions.

SUMMARY OF THE INVENTION

It is an object of this invention to provide an industrial type swivel that has been simplified in its construction with a minimal amount of machining of the parts.

A further object of the invention is to provide an industrial swivel wherein the major components are constructed by the investment casting process.

A further object of the invention is to provide an industrial swivel that can be pre-assembled together and safely interlocked, yet can be easily disassembled for maintenance and repair.

In its broadest form, the invention comprises an industrial swivel having an upper connection with a barrel cavity to receive a lower connection having a shank. Pre-assembled upon the shank, prior to its connection into the cavity, is a thrust bearing between upper and lower retention means with a non-threaded means to rotatably interlock the pre-assembly into the barrel of the cavity.

The specific form of the invention is directed to a swivel having an upper connector with a barrel cavity depending therefrom. The cavity has, internally, at least one slot at the bottom connecting with a circumferential groove thereabove. The groove includes adjacent at least one slot at least one detent ledge and an adjoining lock ledge. The lower connector includes a shank having contoured groove below the upper end of the shank. The shank is rotatably retained in the barrel cavity by pre-assembled parts comprising a plug that is rotatably attached at the bottom of the shank. The plug has a flange which has an upper face that abuts a bottom face of the barrel cavity. Above said upper face of the plug flange is an upper lug for each slot. A resilient gasket is provided between said upper face of the plug flange and the bottom face of the barrel cavity. A bushing is positioned co-axially within the plug between the plug and the shank. A thrust bearing is provided above the plug and retained there by a split nut thereabove. The split nut has an interior contour to fit the contoured groove on the shank. A collar surrounds the split nut to retain the split nut there assembled around the shank. The pre-assembled parts are positioned and retained within the barrel cavity by inserting the upper lug or lugs into each slot and forcibly rotating the plug across the detent ledge with the lug thereafter dropping into the appropriate lock ledge.

The location of the detent ledge relative to the bottom surface of each lug is such that the resilient gasket positioned between the upper face of the plug flange and the bottom face of the barrel cavity is of thickness to create a compression force to restrain the lug from jumping the detent ledge and to further create a seal between the upper face of the plug flange and the bottom face of the barrel cavity when in the locked position.

A grease opening and zerk are positioned on one of the barrel for filling the cavity after assembly. In one embodiment, a set screw is provided in the cavity for retaining the plug in the locked position.

BRIEF DESCRIPTION OF THE DRAWINGS

FIG. 5 is a sectional view of the lower portion of the barrel cavity.

FIG. 6 is an end view taken along the line 6—6 of FIG. 5.

FIG. 7 is a side elevational view of the plug of this invention.

FIG. 8 is a top elevational view of the plug of FIG. 7.

DETAILED DESCRIPTION OF THE PREFERRED EMBODIMENT

Before explaining the present invention, in detail, it is to be understood that the invention is not limited in its application to the details of construction and arrangement of parts illustrated in the accompanied drawings, since the invention is capable of other embodiment and being practiced or carried out in a variety of ways. Also, it is to be understood that the phraseology or terminology employed herein is for the purpose for description and not of limitation.

Figure 1:
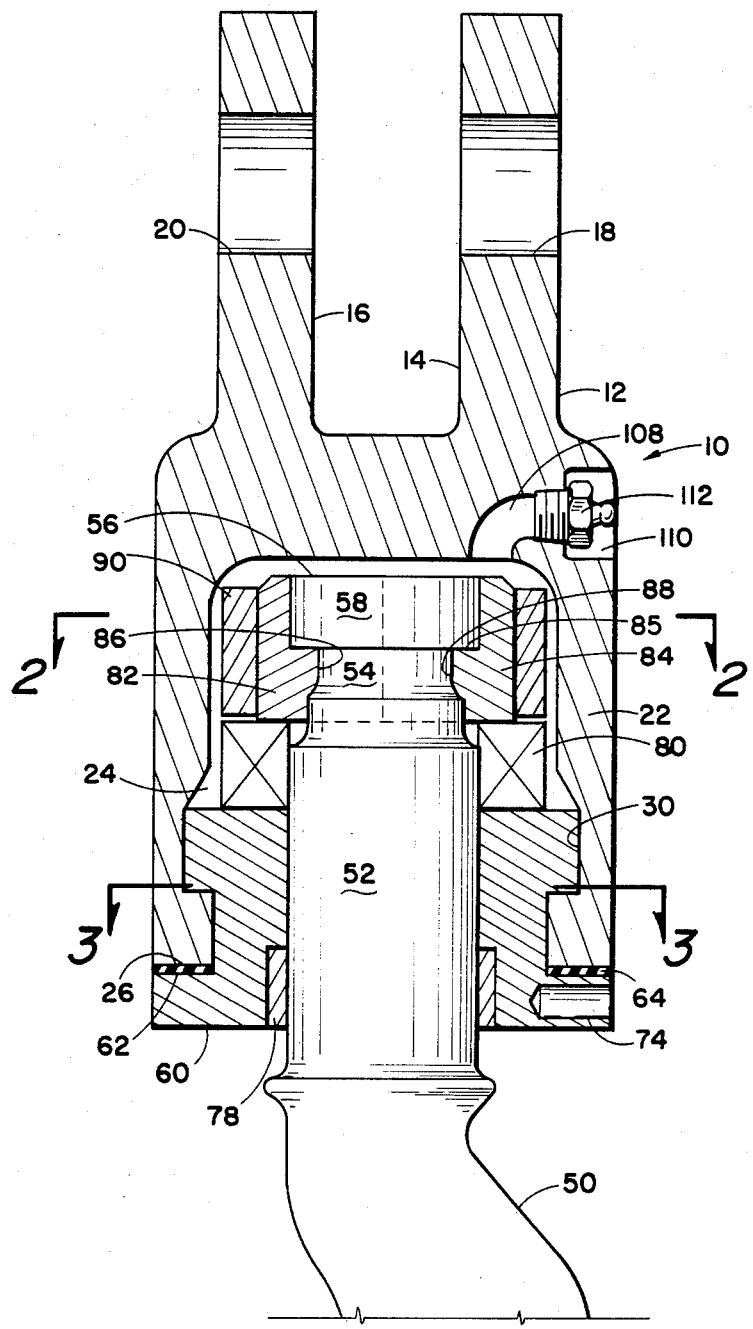
FIG. 1 is a sectional view of the swivel assembly of this invention.
Figures 2, 3, 4:
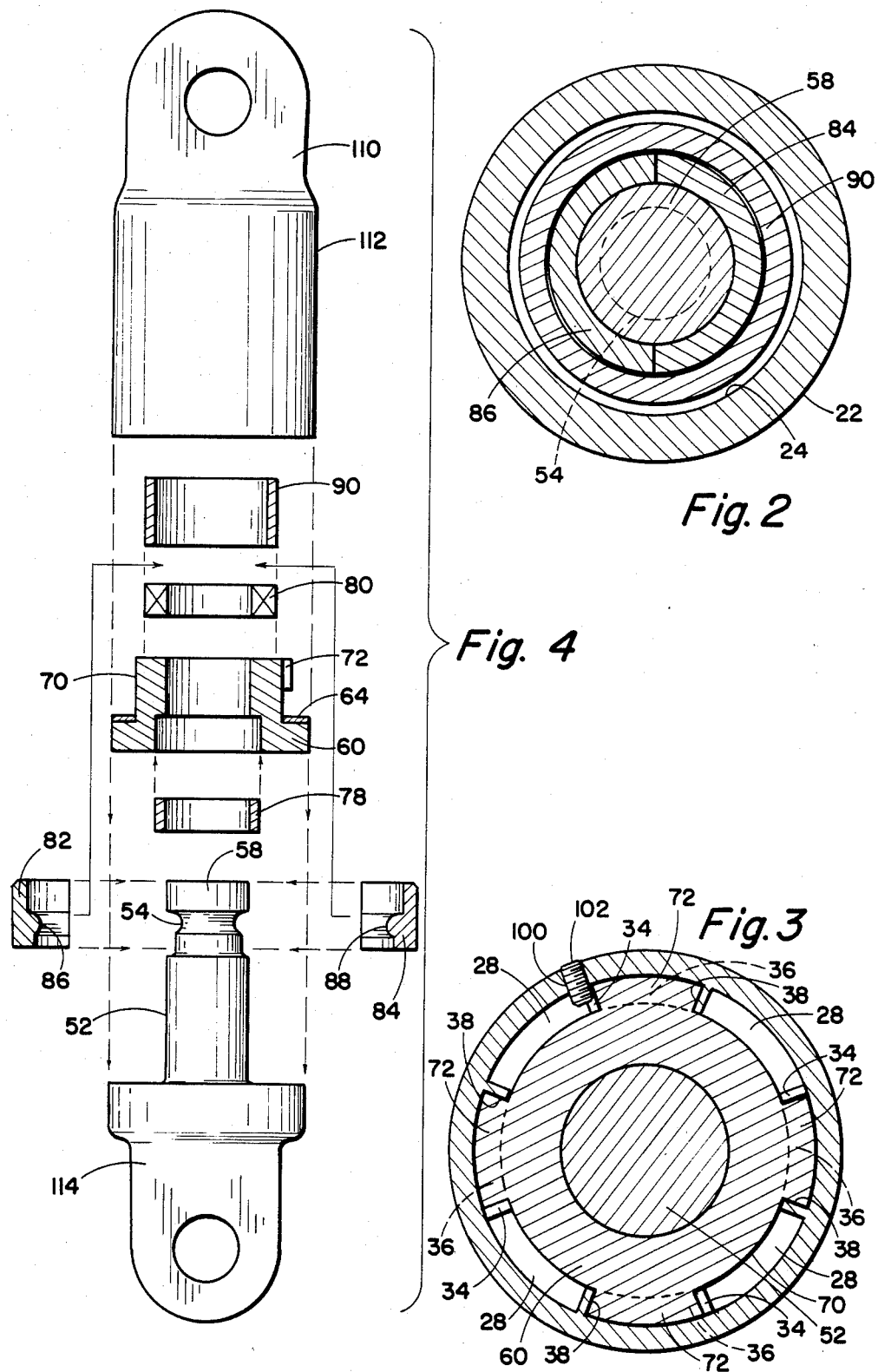
FIG. 2 is a sectional view taken along the line 2—2 of FIG. 1.
FIG. 3 is a sectional view taken along the line 3—3 of FIG. 1.
FIG. 4 is an exploded view of the connector assembled parts in accordance with this invention.

As shown in FIG. 1, the industrial swivel of this invention is generally designated by the numeral 10 and includes an upper connector 12, in this instance, a jaw type having parallel legs 14 and 16 with co-axial openings 18 and 20. The upper connector has, depending therefrom, a barrel portion 22 with a cavity 24. The barrel terminates with a bottom face 26. As best shown in FIG. 3 the bottom of the cavity internally includes at least one or as shown a plurality of slots 28. Each of these slots connects with an internal circumferential groove 30.

As best shown in FIG. 5, the groove 30 includes, around its inner periphery, a detent and lock ledge portion generally designated by the numeral 32, which includes a raised detent surface 34, a lower lock ledge 36 and a vertical stop edge 38.

Referring again to FIG. 1, a lower connector, in this instance a hook 50, only the top portion of which is shown, includes a shank 52. The upper end of the shank includes a contoured groove 54 positioned below the top 56 of the shank, forming a knob 58. The shank 52 is rotatably retained within the barrel cavity by the combination of pre-assembled parts that include a plug 60, as best described in FIGS. 7 and 8. The plug has a flange with an upper face 62 adapted to match the lower face 26 of the barrel. In the assembled condition a resilient gasket 64 is provided between the two faces. The plug has a cylindrical surface 70 with a plurality of bayonet type lugs 72 formed as a part at the top of the plug which provide the interlocking connection with the barrel cavity as hereinafter described. Each lug is formed with a curved or radius surface 73. Also formed as a part of the plug is a transverse opening 74 for receiving a handle or other instrument to aid in rotating and locking the plug in place. A bronze bushing 78 is provided between the plug and shank 52 as a bearing surface.

Above the plug is situated a thrust bearing 80 which is retained in the assembled position by a nut which is split into two portions 82 and 84 (See FIG. 2), the nut having a contoured surface 86 and 88 which will match or fit into the contoured surface 54 of the shank 52. Flat surface 85 under load condition transmits the forces through the split nut to the shank through knob 58. Thus, there is very little outward force against cylindrical collar 90 which is positioned as a slip fit around the split nut to retain said parts 82 and 84 in the assembled condition as shown.

Also formed as a part of the barrel cavity is a threaded set screw opening 100 which is positioned such that one edge of the hole is in line with the detent shoulder 34. (See FIGS. 3, 5 and 6). A set screw 102 is provided therefor.

An opening 108 is provided in the upper part of the barrel cavity which includes an enlarged recess portion 110 with a standard grease zerk 112 press fit or threadably closing the opening 108 for supplying lubricant to the cavity 24.

The exploded view of FIG. 4 describes an upper eye connector 110 having a barrel and cavity 112 to receive the lower connector, in this instance a single eye 114 having a shank 52 and the heretofore similarly numbered assembled parts shown exploded.

In the assembly of the swivel the plug 60 and its associated bushing 78 are first positioned over the shank 52 at the bottom thereof. Gasket 64 is then placed upon the upper face 62. Thrust bearing 80 is then positioned atop the plug 60 and split nut halves 82 and 84 are then assembled with the contoured portions 86 and 88 matching the surface 54. Thereafter the sleeve 90 is positioned around the split nut to retain the parts in the assembled conditions. The parts then placed into the cavity 24 with the lugs 72 of the plug 60 being inserted upwardly through appropriate slots 28. The necessary applied torque to interlock the plug with the cavity occurs by the use of a spanner wrench which may be inserted into opening 74 formed on the flange of the plug 60. By combining upward compression of the gasket 64 and rotation of the plug, the radius surfaces 73 ride over detent ledges 34 until the lug is opposite and resting in the lock ledge 36 with any further rotative movement being restrained by the stop edge 38. To test whether or not the plug has been properly positioned within the cavity, a set screw 102 is then threaded within opening 100 as best shown in FIG. 3. In the event there has not been sufficient rotation of the plug, the set screw will not enter into the cavity advising that further rotation is necessary. Thereafter the cavity is lubricated by being filled with grease through zerk type valve 112 utilizing a common grease gun. Disassembly of the unit can be achieved by a reversal of the steps described above.

Although only two types of connection combinations are shown, i.e., an upper jaw and lower hook (FIG. 1) and upper eye and lower eye (FIG. 4), it is to be understood that other combinations are inclusive of the invention including but not limited to an upper jaw/lower jaw, upper jaw/lower eye, upper eye/lower jaw and upper eye/lower hook.

What is claimed is:

1. A swivel for industrial use comprising:
   an upper connector having a barrel cavity, detented ledge means within said barrel cavity to receive and rotatably lock with a bayonet-type connector lug means;
   a lower connector having a shank, said shank rotatably retained in said barrel by pre-assembled parts that comprise:
   a plug rotatably attached to the bottom of said shank, and plug having said bayonet-type connector lug means, said plug having a flange which has an upper face toward a bottom face of said barrel;
   a resilient seal ring means between said upper face of said plug flange and said bottom face, said seal ring being in compression to retain said bayonet-type connector lug means and detented ledge means in said locked position and to seal between said plug and said barrel cavity;
   a thrust bearing above said plug; and
   means positioned above said thrust bearing about said shank to retain said thrust bearing in its preassembled condition; and
   means to fill said cavity with lubricant.

2. A swivel for industrial use comprising:
   an upper connector having a barrel cavity depending therefrom, said cavity having, internally, at least one slot at the bottom connecting with a circumferential groove thereabove, said groove including at least one horizontal detent ledge above a lock ledge;
   a lower connector having a shank, said shank having a groove below the upper end of said shank, said shank rotatably retained in said barrel cavity by pre-assembled parts that comprise:
   a plug attachable to the bottom of said shank, said shank rotatable relative to said plug, said plug having a flange which has an upper face to abut a bottom face of said barrel and an upper lug for each slot which when assembled to said upper connector has been forcibly rotated across said detented ledge and retained in said lock ledge;
   a resilient compression gasket between said lower face and said bottom face of said barrel;
   a thrust bearing above said plug;
   a split nut above said thrust bearing, said nut having an interior contoured to fit said groove of said shank, a collar surrounding said split nut to retain said split nut in its assembled condition; and
   means to fill said cavity with lubrication.

3. The swivel of claim 2 including a bushing between said plug and said shank.

4. The swivel of claim 2 wherein said groove is a smooth contour.

5. The swivel of claim 2 wherein the top of said interior contour of said groove of said shank including a flat horizontal surface.

* * * * *